3,098,074
6-THIOCARBOXAMIDOPURINE
George H. Hitchings, Yonkers, Gertrude B. Elion, Bronxville, and Lottie E. Mackay, Pleasantville, N.Y., assignors to Burroughs Wellcome & Co. (U.S.A.) Inc., Tuckahoe, N.Y., a corporation of New York
No Drawing. Filed Nov. 18, 1959, Ser. No. 853,684
1 Claim. (Cl. 260—252)

This invention relates to a novel group of cyano purines and methods for their preparation. In particular, the invention comprises compounds of the formula:

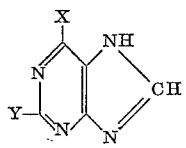

wherein X is selected from the class consisting of the cyano, carboxy, carboxamido, and functional derivatives of these radicals and Y is selected from the class consisting of hydrogen and amino. Compounds of this nature are valuable in the treatment of various forms of neoplastic growth, especially in connection with the treatment of leukemias. In connection with this most valuable function, the compounds are inhibitors of unnatural cell division normally associated with cancerous growth. This is a continuation-in-part of applications Serial Nos. 375,819 and 525,382, now abandoned, and Serial No. 367,772, now Patent 2,746,961.

The derivatives may be conveniently prepared by the reaction of a 6-halogen purine with a metal cyanide in an inert solvent. The resulting derivative can then be readily converted to form amino and amino alkyl derivatives, which can then be hydrolyzed to form amides, carboxylic acid and ester derivatives or, alternatively, converted into amidines.

The following examples are illustrative:

EXAMPLE 1

*6-Cyanopurine*

A mixture of 29.5 g. of 6-iodopurine, 16 g. of cuprous cyanide and 300 ml. of dry pyridine was heated under reflux conditions for two hours. The reaction mixture was cooled, filtered and the solid residue washed with ether. To the combined pyridine and ether filtrates was added 1 liter of ether and the precipitate filtered off, after chilling, and discarded. The filtrate was taken to dryness under reduced pressure. The residue, consisting of crude 6-cyanopurine, was dissolved in 100 ml. of saturated aqueous sodium chloride solution and extracted five times with ether. The ether extracts, after drying, were evaporated to dryness to give 8.9 g. of 6-cyanopurine, M.P. 177–178°.

EXAMPLE 2

*6-Carboxypurine*

A suspension of 3 g. of 6-cyanopurine in 15 ml. of 2 N sodium hydroxide was heated under reflux conditions for two hours. The resulting clear solution was cooled, acidified to pH 2 with hydrochloric acid and the 6-carboxypurine (3.3 g.) filtered off. After recrystallization from water the product melted at 198° with decomposition.

EXAMPLE 3

*6-Carboxamidopurine*

A mixture of 3 g. of 6-cyanopurine and 10 ml. of 2 N sodium hydroxide was heated under reflux conditions for one hour. The cooled suspension was neutralized to pH 7 with hydrochloric acid and the precipitate of 6-carboxamidopurine (3.2 g.) collected. After recrystallization from water, the crystalline product melted at ca. 320° with decomposition.

EXAMPLE 4

*6-Thiocarboxamidopurine*

Hydrogen sulfide was passed through an ice-cooled solution of 1.45 g. of 6-cyanopurine in 20 ml. of saturated absolute ethanolic ammonia for four hours. The yellow suspension was evaporated to dryness on the steam bath to give 1.75 g. of 6-thiocarboxamidopurine. After recrystallization from methanol, the product melted at 240–242° with decomposition.

EXAMPLE 5

*6-Carboxypurine Ethyliminoether Hydrochloride*

Dry hydrogen chloride was passed through an ice-cooled suspension of 4.5 g. of 6-cyanopurine in 25 ml. of absolute ethanol for 5 hours. The suspension was kept at 4° overnight, and the precipitate of 6-carboxypurine ethyliminoether hydrochloride monoethanolate (6.5 g.) filtered off, washed with absolute alcohol and dried in a vacuum desiccator.

EXAMPLE 6

*6-Carboxamidinopurine*

A mixture of 5.5 g. of 6-carboxypurine ethyliminoether hydrochloride and 100 ml. of saturated absolute ethanolic ammonia was heated in a sealed tube at 100° for 16 hours. The mixture wash chilled and the crude 6-carboxyamidinopurine hydrochloride filtered off. This was dissolved in dilute hydrochloric acid and the free 6-carboxamidinopurine precipitated by the addition of 5% sodium bicarbonate solution. The yield was 2.4 g., M.P. 316–320° with decomposition.

EXAMPLE 7

*2-(6-Purinyl)-Imidazoline*

A mixture of 2.74 g. of 6-carboxypurine ethyliminoether hydrochloride monoethanolate, 1.8 g. of ethylene diamine and 25 ml. of absolute ethanol was heated in a sealed tube at 110–120° for 3 days. After cooling, the precipitate of crude 2-(6-purinyl)-imidazoline hydrochloride (1.95 g.) was filtered off and washed with ether and petroleum ether. The hydrochloride was dissolved in water and the free 2-(6-purinyl)-imidazoline M.P. 287–288° decomp., precipitated at pH 8 by the addition of 5% sodium bicarbonate solution.

The compounds 6-cyanopurine and 2-amino-6-cyanopurine are readily converted to 6-mercaptopurine and 2-amino-6-mercaptopurine.

What we claim is:
6-thiocarboxamidopurine.

No references cited.